Aug. 22, 1933.  F. HOTCHNER  1,923,148
METHOD AND MEANS OF FABRICATING TUBING OF VITREOUS MATERIAL
Filed Oct. 5, 1929  2 Sheets-Sheet 1
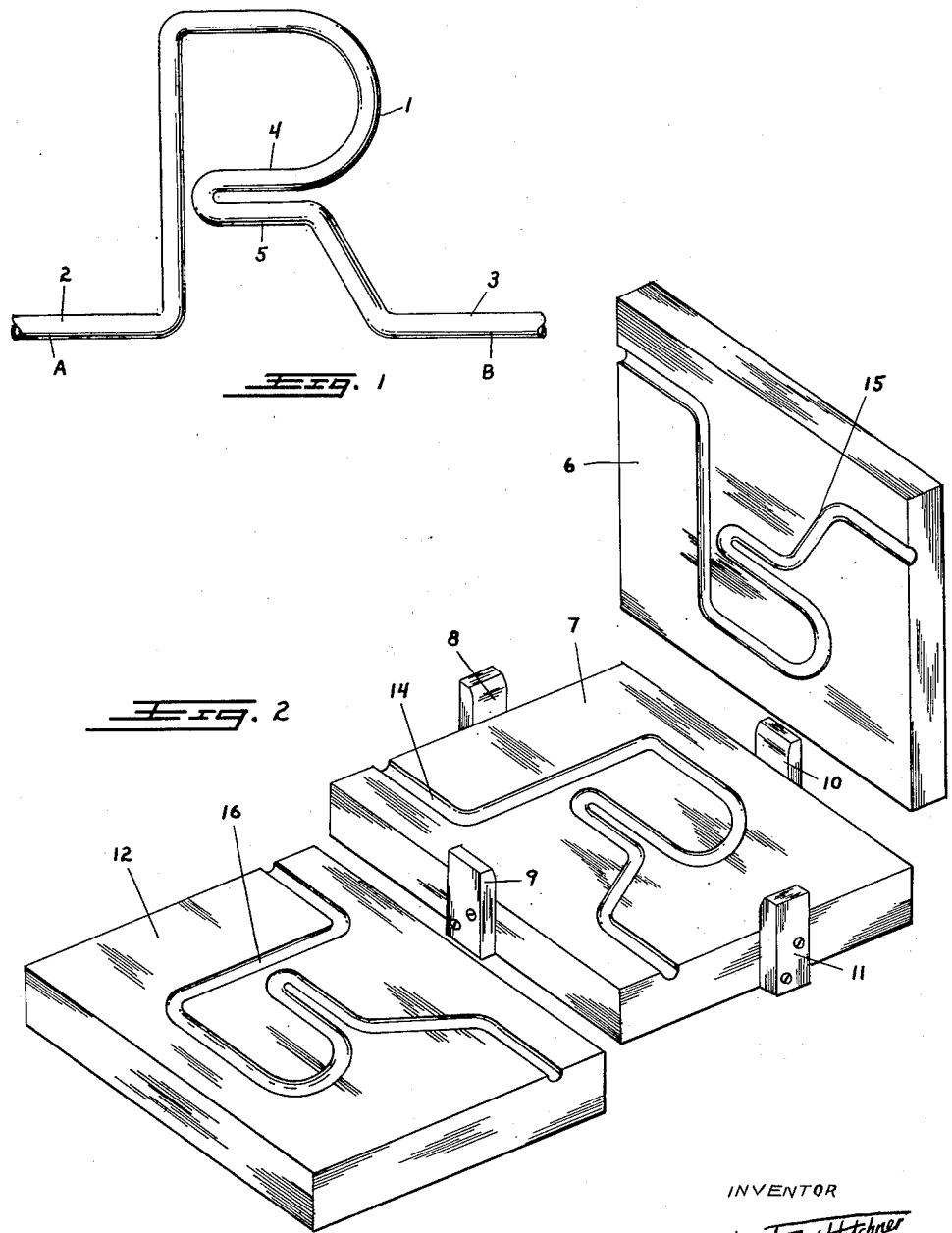
INVENTOR
Fred Hotchner

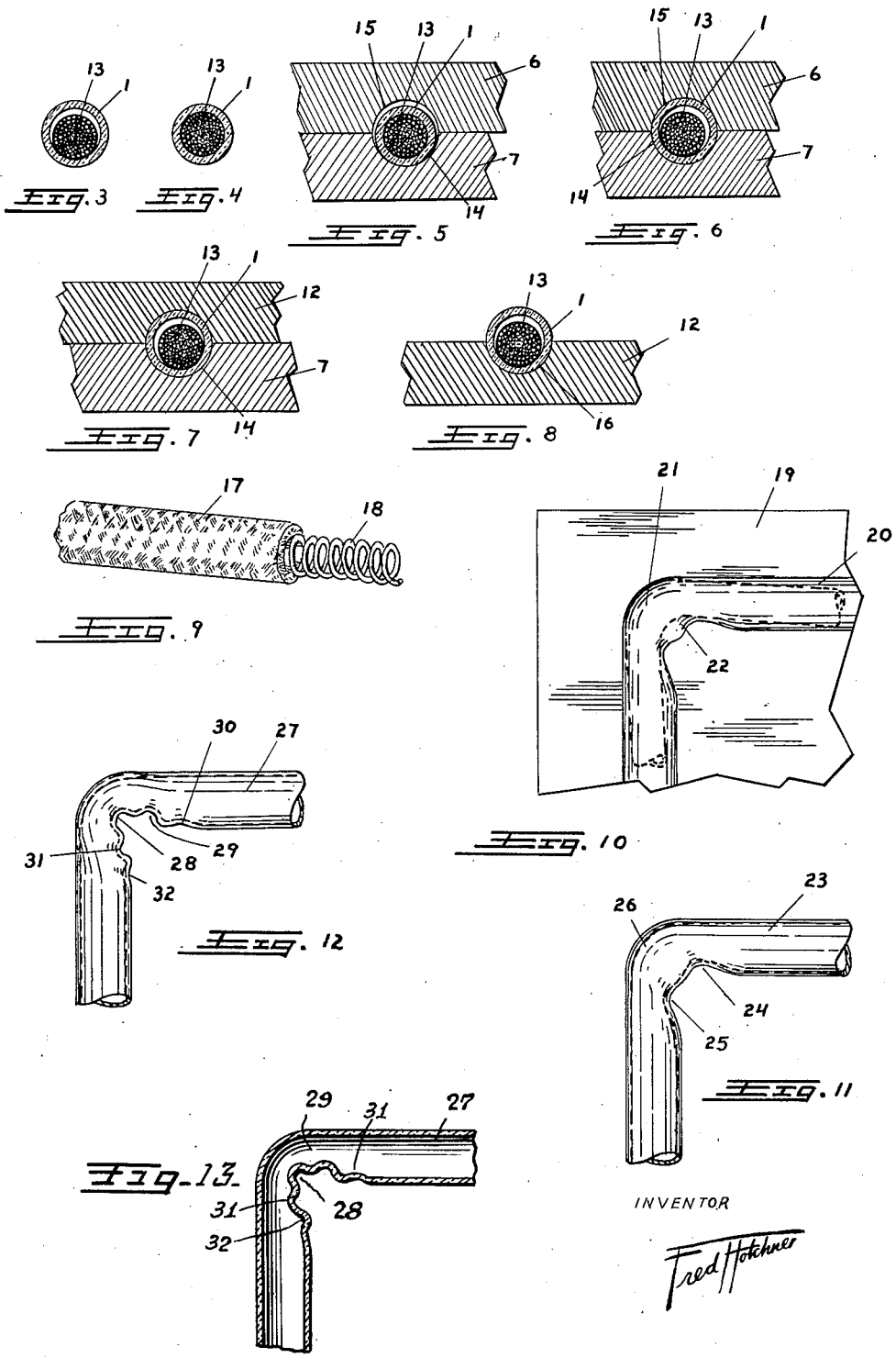

Patented Aug. 22, 1933

1,923,148

UNITED STATES PATENT OFFICE 1,923,148

METHOD AND MEANS OF FABRICATING TUBING OF VITREOUS MATERIAL

Fred Hotchner, Los Angeles, Calif.

Application October 5, 1929. Serial No. 397,551

18 Claims. (Cl. 49—7)

This invention relates to a method of forming tubing of vitreous material, such as glass, into special shapes. An illustration of one application of this invention is the formation of straight tubes of glass or similar material into letters or characters for discharge tube signs, altho it is to be understood that there are many other ways in which the invention can be applied to advantage in the arts.

One object of the invention is to speed up production and reduce the cost, and to eliminate the necessity of specially skilled workers. Another object is to provide for accurate dimensioning of the product and the reproduction in quantity of articles of uniform dimensions. A further object is to provide finished articles in which thin spots in the walls thereof will be eliminated, or at least considerably reduced as compared with the hand made product. It is also an object of the invention to provide finished articles in which whatever changes occur in the thickness of the walls are gradual and in which lumps or ridges are infrequent or of small consequences as compared with the hand made product, thereby providing for a product practically free from strains due to non-uniformity in the walls thereof.

Another object is to provide means of forming a considerable length of tubing at one time, each portion thereof going thru the same sequence of temperature changes thruout the process, in order that a wider selection of material may be made than is possible under the severe limitations that the hand process imposes as to materials. In the furtherance of this object the invention provides means to finally anneal the work.

The forming of tubing by hand is an extremely slow and difficult process. The method now universally used is to heat a section of the tubing over a gas fire until it has attained a temperature sufficient to soften it but insufficient to cause it to flow in obedience to the laws of viscosity. The tendency of glass and similar material, when hot, is to flow into the shape of a sphere due to the internal forces and at the same time to sag under the influence of gravity. There is a very limited range of temperature available to the worker with the present method between the temperature where the material can be shaped and the temperature at which it is out of control. Consequently it is necessary for him to heat a short section of the tubing, work it by bending and applying air pressure and as soon as it cools reheat it, and continue the process. A number of reheatings are usually necessary at each section along the tube and the rate of progress is very slow. Highly skilled workers are necessary in order to produce finished articles that are free from strain and sufficiently uniform in the condition of the walls to be serviceable. With the average worker there is a great deal still to be desired in the character of the work turned out by this method, as an appreciable amount of work is spoiled by residual stresses and minute cracks. Any non-uniformity in the thickness of the walls increases the percentage of breakage of the articles in transportation and use. Therefore it is a further object of this invention to provide means of heating a long section of tubing at once and to a much higher temperature than that which can be used by the present method in order that a long section of tubing can be formed at once and ample opportunity be given the worker to perform the operations necessary in the process before the material becomes too stiff to work. In order to still further extend the working period means are provided to retain more heat in the piece being worked than the material itself is capable of holding.

In the embodiment of the invention here shown a mould is used to give the finished article its desired shape. As the efficiency of the process depends a great deal on how rapidly the article can be removed from the mould after it has been given its shape it is a further object of the invention to provide means to rapidly cool the article without removing it from the mould, down to a temperature sufficiently low to permit the removal from the mould in order that the mould may be available for another article.

It is a further object of the invention to provide means for receiving the article from the mould without tending to distort the same in order that the moulds can be cleared as soon as the material has cooled sufficiently to prevent collapsing of the walls but while still at a high temperature.

It is a further object of the invention to provide means of holding together a length of tubing that has been heated above the temperature at which it begins to flow, in order that it may be handled, moved from place to place and manipulated into position into the mould without pulling apart.

Another object of the invention is to provide means of making bends in the tubing without thinning out the outer edge of the tubing around the bends.

When tubing is formed into discharge tube signs, it is necessary that the sharp corners be somewhat rounded off in order to avoid stresses in the finished article. A sharp corner is desirable in many cases in order that the discharge will be guided to as sharp a corner as possible for the sake of a true representation of the characters in the form of which the tubing is bent. This is accomplished in a degree by some electric sign manufacturers by forming the tubing up of individual pieces which are jointed to a sharp corner wherever a sharp corner is to be indicated. Such expedient is, of course, quite expensive and not entirely satisfactory at that for the discharge often follows the inner wall of the bend in a natural tendency to round off the bend. Therefore one object of this invention is to provide for the manufacturing of tubing with corners which are sharp from continuous pieces of tubing and further for the production of corners so constructed as to tend to keep the discharge closer to the outer wall of the tubing at the corner to accentuate the effect of sharp bends.

Other objects of the invention have to do with various features which will hereinafter be more fully described and set forth in the appended claims.

An embodiment of the invention as applied in the manufacture of discharge tube sign letters is shown in the accompanying drawings in which the same numeral refers to the same part wherever shown in more than one view.

Figure 1 is an elevation of a finished letter made of glass tubing by this process.

Figure 2 is a view in perspective of the mould from which the letter shown in Figure 1 was formed together with the receiving form which is used to receive the letter from the forming mould.

Figure 3 is a cross section of a piece of tube with the filler, shown in the condition which they are in before heating.

Figure 4 is a cross section of the tube and filler shown in Figure 3, shown in the condition in which they are in when heated to the extreme temperature possible with this process.

Figure 5 is a cross section of a portion of the forming mould with the tube and filler in position ready for expanding.

Figure 6 is a similar section to Figure 5 after the tube has been expanded.

Figure 7 is a cross section showing the upper portion of the mould removed and the receiving form in position ready to transfer the work from the mould to the form.

Figure 8 is a cross section of a portion of the receiving form with the tube in position after it has been removed from the mould.

Figure 9 is a perspective view of a special kind of filler, shown with a part of the covering removed.

Figure 10 is a plan view of a portion of a mould in which an improved method of forming corners is illustrated. The broken lines indicate the position of the tube before expanding.

Figure 11 is a view of a piece of tubing formed in the mould illustrated in Figure 10.

Figure 12 is a view of another type of improved corner.

Figure 13 is a sectional view of the tubing shown in Figure 12.

The letter shown in Figure 1 is shown as an illustration of the adaptation of this invention to the particular art of forming tubing for ionization conductor signs. It is to be understood that the invention is not limited to that purpose but is applicable in many ways in various industries. The letter shown in the view is formed in one plane. The letter is indicated by numeral 1, and has two end portions 2 and 3 for the purpose of joining up to other letters or of extending to the electrode terminals. The portions indicated by numerals 4 and 5 are here shown as being in the same plane as the rest of the letter. In practice, if it is desired that one of these portions should be behind the other, this can be done by the use of multiple part moulds.

In Figure 2, the parts indicated by numerals 6 and 7 are the two halves of the forming mould. Ordinarily they would be of iron and the surfaces may if desired be treated to prevent the adhesion of the glass thereto. The guides 8, 9, 10 and 11 serve to position the two halves together. Numeral 12 indicates the receiving form which is also positioned to the lower part of the mould by the guides.

In the practice of this invention a number of lengths of tubing are prepared, each of a length somewhat over that necessary to form the desired article, with a filler indicated by 13 inserted in each length of tube. The requirements of the filler are these; that it should not adhere to the material of the tube when hot, should be permeable to air, should have sufficient mechanical strength to prevent the tube from collapsing, should be flexible and should be of such nature that it can be removed from the tube after cooling. I prefer that the filler be in the form of a rope or the like in order that the tube may be heated to a very high temperature and the filler may be depended upon to hold the mass together and permit handling from the ends without danger of the mass pulling apart. However the filler may also be in the form of loose particles answering, when packed in the tube, the requirements above stated.

The tubes are heated in an oven to a regulated temperature. They are taken, one by one, and formed in the mould and transferred to the receiving forms. The temperature to which the tube is heated should be sufficiently high to keep the tube plastic during the forming process. This can be considerably higher than that now used by the hand process as the filler provides the support for the tube when it becomes too hot to hold together, in fact the tube can be heated to a temperature at which it shrinks together and closes down on the filler as shown in Figure 4. The material of the filler also holds a certain amount of heat and hence a comparatively extended working period is provided, during which the operator has ample time to properly position the work in the mould.

It is preferred that when the work is in the mould, the ends of the tube, indicated by "A" and "B" in Figure 1, be comparatively cool in order that the portions extending out of the mould shall be sufficiently stiff to permit the application of air pressure. One way of accomplishing this end is by differential heating of the tubes before placing in the mould. Other methods of applying air pressure to the inside of the tube, however are available. In positioning the work in the mould it is well to crowd the work to the outside of all curves and corners in order to prevent thinning out of the outer wall of the tube.

In this process it is possible to make use of different compositions in the glass and take advantage of superior glasses as compared with those that can be used in the hand process. The necessity of continually reheating the glass is a decided limitation as many glasses suffer in chemical and physical characteristics by such treatment. By the hand process it is also extremely difficult to use the hard glasses. A very important advantage lies in this process in that besides it being possible to work to high temperatures, it is also possible to anneal the pieces and secure a uniform product as each section of the tube has gone thru the same sequence of temperature changes.

In forming the articles, the heated tube is first placed in the lower portion of the mould. The mould is then closed and air pressure is applied to the inside of the tubing. The filler 13 being permeable to air the tubing is expanded and takes the form of the grooves 14 and 15. Air might then be circulated thru the tube to reduce the temperature sufficient to prevent the walls from collapsing. The mould is then opened with the work remaining in the groove of the lower portion 7. The receiving form 12 is then placed over the work as shown by Figure 7, the whole is then turned over and the half mould removed, leaving the work in the groove 16 of the receiving form. The form and the work are then placed in an annealing oven if the nature of the glass used requires such treatment. The form 12 can be made of such material as an asbestos composition and can be made much cheaper than the mould, a number of forms being required for each mould.

In Figure 9 one form of filler is shown. It consists of a braided tube of material, non-adhesive to the material of the tube when hot, with a coiled spring inside to hold it up. The tube is permeable to air and a large air passage is provided by the hollow center to permit of a uniform pressure thruout the length of the piece. The braided tube is indicated by 17 and the spring by 18. I prefer to use asbestos for the braid altho other materials might also be used.

In Figure 10 a method of providing for uniform thickness of the walls of the tube is shown. Here a portion of one half of a mould is indicated by 19. Two straight legs of a groove 20 meet at a corner 21. The inner surface 22 of the groove at the corner follows a contour designed to fold up the material of the tube in gradually curving surfaces in order that it will not become lumped up in localized masses. The condition of tubes so formed is illustrated by Figure 11, 23 indicating the tube. Two inwardly projecting ridges 24 and 25 serve to direct the discharge towards the corner 26 thus securing in effect the advantages of a much sharper bend.

Another type of corner is shown in Figure 12, in which 27 indicates the tube having a deep protrusion 28 to send the discharge into a sharp bend, and several lesser folds 29, 30, 31 and 32. Here again the selection of surfaces is determined by the amount of material to be folded to compensate for the bend in the tube. By the term "vitreous material" as used in the claims I have reference to material of glass-like character as contrasted to such materials as metal and fibre. The outstanding characteristic of vitreous material is the absence of a definite melting point and the tendency to flow into a spherical form as soon as the temperature is raised above that temperature at which it is rigid. As will be seen in Figure 13 the discharge passage is made to present a sharper corner than that of the tube itself by virtue of the protuberances 28 to 32 which force the discharge to the outside of the bend.

Having thus described my invention, what I claim is:

1. The method of forming a body of vitreous material which consists in providing a body of vitreous material incapable of supporting itself when heated to the working temperature with a flexible supporting body having a surface of such nature as to be non-adhesive to said vitreous material when hot; heating both said bodies together, forming both said bodies together when hot, and subsequently separating both said bodies from each other.

2. The method of forming a body of vitreous material which consists in providing a body of vitreous material incapable of supporting itself when heated to the working temperature with a flexible supporting body having a surface of such nature as to be non-adhesive to said vitreous material when hot and being of such nature as to be capable of supporting said body of vitreous material when heated beyond the degree of temperature at which the said vitreous material ceases to be capable of retaining its own form; heating both said bodies together, and forming both said bodies together.

3. The method of forming a body of vitreous material which consists in providing therefor a flexible supporting body having a surface of such nature as to be non-adhesive to said vitreous material when hot, said supporting body being pervious to fluid; heating both said bodies together, forming both said bodies together when hot, and applying fluid pressure to said supporting body to effect a separation of both said bodies from each other.

4. The method of forming a body of vitreous material which consists in providing therefor a supporting body pervious to fluid; heating both said bodies together, placing said bodies in a mould, and applying fluid pressure to said supporting body.

5. The method of forming a body of vitreous material which consists in providing therefor a supporting body pervious to fluid and being of such shape as to be capable of supporting said body of vitreous material when heated to a degree of temperature beyond that at which said vitreous material ceases to be capable of retaining its form; heating both said bodies together, placing said bodies in a mould when hot, and applying fluid pressure to said supporting body.

6. The method of forming a body of vitreous material which consists in providing therefor a supporting body pervious to fluid and being of such shape as to be capable of supporting said body of vitreous material when heated at least to a degree of temperature at which said vitreous material ceases to be capable of retaining its form; heating both said bodies together, placing both said bodies in a mould when hot, applying fluid pressure to shape said body of vitreous material to said mould and subsequently circulating fluid thru said work in said mould to reduce the temperature of said body of vitreous material.

7. The method of manufacturing articles of vitreous material which consists in heating and forming said articles in a mould, opening said mould when still hot, applying a supporting form to the portion of said mould still retaining said articles when open, transferring said articles from said mould to said supporting form and allowing said articles to cool in said supporting form.

8. The method of forming tubing of vitreous material which consists in providing a length of tubing of vitreous material incapable of supporting itself when heated to the working temperature with a filler body which is non-adhesive to said vitreous material when hot; heating said tubing, forming said tubing with the contained filler when hot and subsequently removing said filler.

9. The method of forming tubing of vitreous material which consists in providing a length of tubing of vitreous material incapable of supporting itself when heated to the working temperature with a supporting body which is flexible and capable of supporting said tubing when heated at least to a degree of temperature sufficient to render said tubing nonself-supporting; heating said tubing with the contained supporting body, forming said tubing when hot, and subsequently removing the said supporting body.

10. The method of forming tubing of vitreous material which consists in providing a length of said tubing with a supporting body flexible and pervious to fluid; heating said length of tubing with the contained body, forming said tubing when hot and applying fluid pressure within said tubing to effect a separation of said tubing from said supporting body.

11. The method of forming tubing of vitreous material which consists in providing a length of tubing of vitreous material incapable of supporting itself when heated to the working temperature with means to prevent the walls thereof from collapsing when hot, heating said tubing, bending said tubing to the general form of the desired finished article, and finishing said tubing in a mould providing the form of the desired finished article.

12. The method of forming articles of vitreous material which consists in providing a length of tubing made of said material with means for preventing the collapsing of the walls of said tubing when hot, heating said tubing, and placing said tubing when hot in a mould having the form of the desired finished article, and applying fluid pressure to the inside of said tubing to expand the walls thereof against said mould.

13. The method of forming tubing of vitreous material which consists in providing a length of said tubing with a flexible filler capable of holding a length of said tubing together when heated at least to such a degree of temperature as to render the said tubing nonself-supporting, the said filler being pervious to fluid and being non-adhesive to the said vitreous material when hot; heating said tubing with the contained filler, forming said tubing when hot, and applying fluid pressure within said filler while the said vitreous material is still plastic to effect a separation of the said filler from the walls of said tubing.

14. The method of forming tubing of vitreous material which consists in providing a length of said tubing with a supporting filler, pervious to fluid, flexible and having a surface non-adhesive to the said vitreous material when hot and capable of holding said tubing together when heated at least to a degree of temperature sufficient to cause said tubing to be incapable of retaining its form during manipulation; heating said tubing with the contained filler, placing said tubing when hot in a mould having the form of the desired finished article, and applying fluid pressure to the inside of said tubing to expand the same into the form and effect a separation from the said filler.

15. The method of forming a bend in a tube of vitreous material which consists in folding the wall of said tube in the interior of said bend.

16. The method of forming a bend in a tube of vitreous material which consists in folding the wall of said tube in the interior of said bend while maintaining the thickness of said wall substantially uniform.

17. The method of forming a bend in a tube of vitreous material which consists in heating a length of said tubing and blowing a wall thereof into a form having a plurality of depressions.

18. In a discharge tube, a bend and an interior protrusion for the purpose of forcing the discharge to follow a path toward the outside of said bend.

FRED HOTCHNER.